United States Patent
Asnaashari

(10) Patent No.: US 8,966,231 B2
(45) Date of Patent: *Feb. 24, 2015

(54) MODIFYING COMMANDS

(75) Inventor: Mehdi Asnaashari, Danville, CA (US)

(73) Assignee: Micron Technology, Inc., Boise, ID (US)

( * ) Notice: Subject to any disclaimer, the term of this patent is extended or adjusted under 35 U.S.C. 154(b) by 709 days.

This patent is subject to a terminal disclaimer.

(21) Appl. No.: 13/270,675

(22) Filed: Oct. 11, 2011

(65) Prior Publication Data

US 2012/0030452 A1 Feb. 2, 2012

Related U.S. Application Data

(63) Continuation of application No. 12/351,206, filed on Jan. 9, 2009.

(51) Int. Cl.
| | | |
|---|---|---|
| G06F 7/38 | (2006.01) |
| G06F 9/00 | (2006.01) |
| G06F 9/44 | (2006.01) |
| G06F 15/00 | (2006.01) |
| G06F 13/16 | (2006.01) |

(52) U.S. Cl.
CPC ........ *G06F 13/1642* (2013.01); *G06F 13/1631* (2013.01)
USPC .......................................................... 712/225

(58) Field of Classification Search
None
See application file for complete search history.

(56) References Cited

U.S. PATENT DOCUMENTS

| | | |
|---|---|---|
| 4,654,791 A | 3/1987 | Ushiro |
| 4,797,812 A | 1/1989 | Kihara |
| 4,811,306 A | 3/1989 | Boning et al. |
| 5,182,800 A | 1/1993 | Farrell et al. |
| 5,517,670 A | 5/1996 | Allen et al. |
| 5,526,484 A | 6/1996 | Casper et al. |
| 5,539,918 A | 7/1996 | Allen et al. |
| 5,564,055 A | 10/1996 | Asnaashari et al. |
| 5,640,596 A | 6/1997 | Takamoto et al. |
| 5,717,952 A | 2/1998 | Christiansen et al. |
| 5,742,792 A | 4/1998 | Yanai et al. |
| 5,870,625 A | 2/1999 | Chan et al. |
| 5,901,327 A | 5/1999 | Ofek |
| 5,928,370 A | 7/1999 | Asnaashari |
| 5,974,499 A | 10/1999 | Norman et al. |

(Continued)

FOREIGN PATENT DOCUMENTS

| | | |
|---|---|---|
| JP | 05-289818 | 11/1993 |
| JP | 06-259198 | 9/1994 |

(Continued)

OTHER PUBLICATIONS

International Search Report and Written Opinion for related PCT Application PCT/US2009/006741, mailed Jul. 30, 2010 (9 pgs.).

(Continued)

*Primary Examiner* — Corey S Faherty
(74) *Attorney, Agent, or Firm* — Brooks, Cameron & Huebsch, PLLC

(57) ABSTRACT

The present disclosure includes methods, devices, modules, and systems for modifying commands. One device embodiment includes a memory controller including a channel, wherein the channel includes a command queue configured to hold commands, and circuitry configured to modify at least a number of commands in the queue and execute the modified commands.

25 Claims, 4 Drawing Sheets

(56) References Cited

U.S. PATENT DOCUMENTS

| | | | |
|---|---|---|---|
| 5,978,890 | A | 11/1999 | Ozawa et al. |
| 6,012,104 | A | 1/2000 | Van Nguyen et al. |
| 6,029,226 | A | 2/2000 | Ellis et al. |
| 6,076,137 | A | 6/2000 | Asnaashari |
| 6,134,151 | A | 10/2000 | Estakhri et al. |
| 6,173,377 | B1 | 1/2001 | Yanai et al. |
| 6,185,521 | B1 | 2/2001 | Vishlitzky |
| 6,192,444 | B1 | 2/2001 | White et al. |
| 6,233,660 | B1 | 5/2001 | Vishlitzky |
| 6,321,292 | B1 | 11/2001 | Ozawa et al. |
| 6,327,639 | B1 | 12/2001 | Asnaashari |
| 6,470,432 | B2 | 10/2002 | Ozawa et al. |
| 6,470,445 | B1 | 10/2002 | Arnold et al. |
| 6,564,304 | B1 * | 5/2003 | Van Hook et al. ............ 711/154 |
| 6,915,378 | B2 | 7/2005 | Roberti |
| 7,010,654 | B2 | 3/2006 | Blackmon et al. |
| 7,102,671 | B1 | 9/2006 | Asnaashari |
| 7,181,548 | B2 | 2/2007 | Ellis et al. |
| 7,296,110 | B2 | 11/2007 | Chung et al. |
| 7,328,317 | B2 | 2/2008 | Hillier, III et al. |
| 7,373,465 | B2 | 5/2008 | Hiramatsu et al. |
| 2001/0011323 | A1 | 8/2001 | Ohta et al. |
| 2003/0158999 | A1 | 8/2003 | Hauck et al. |
| 2005/0036453 | A1 | 2/2005 | Lin et al. |
| 2006/0271697 | A1 | 11/2006 | Kruse et al. |
| 2008/0005463 | A1 | 1/2008 | DeCenzo |
| 2008/0107275 | A1 | 5/2008 | Asnaashari |
| 2008/0126641 | A1 | 5/2008 | Irish et al. |
| 2008/0270678 | A1 | 10/2008 | Cornwell et al. |

FOREIGN PATENT DOCUMENTS

| | | |
|---|---|---|
| JP | 2001-290607 | 10/2001 |
| JP | 2003-006135 | 1/2003 |

OTHER PUBLICATIONS

Office Action for related Chinese Patent Application No. 200980156842.3 dated Aug. 14, 2013, 7 pages.

Japanese Notice of Rejection for related Japanese Application No. 2011-545333, mailed Nov. 20, 2012, (3 pgs.).

European Search Report for related EP Application No. 09837729.4, mailed Jul. 27, 2012, (6 pages).

Japanese Decision of Rejection for related Japanese Application No. 2011-545333, mailed Mar. 19, 2013, (3 pgs.).

Taiwanese Office Action for related Taiwan Application No. 098146473, mailed Feb. 21, 2013, (13 pgs.).

Examination Report from related European patent application No. 09837729.4, dated May 28, 2014, 4 pp.

* cited by examiner

415

| CMD 1 | PROGRAM LBA 1000, 16 SECTORS | 425-1 |
| CMD 2 | READ LBA 2000, 4 SECTORS | 425-2 |
| CMD 3 | PROGRAM LBA 1000, 48 SECTORS | 425-3 |
| CMD 4 | READ LBA 2002, 10 SECTORS | 425-4 |
| CMD 5 | READ LBA 2000, 16 SECTORS | 425-5 |
| CMD 6 | PROGRAM LBA 1040, 16 SECTORS | 425-6 |
| CMD 7 | PROGRAM LBA 3000, 2 SECTORS | 425-7 |
| CMD 8 | PROGRAM LBA 3002, 2 SECTORS | 425-8 |
| ⋮ | ⋮ | |
| CMD M | CHANNEL COMMAND SLOT M | 425-M |

| CMD 1 | PROGRAM LBA 1000, 56 SECTORS | 425-1 |
| CMD 2 | READ LBA 2000, 16 SECTORS | 425-2 |
| CMD 3 | PROGRAM LBA 3000, 4 SECTORS | 425-3 |
| ⋮ | ⋮ | |
| CMD M | CHANNEL COMMAND SLOT M | 425-M |

*Fig. 4B*

MODIFYING COMMANDS

CROSS-REFERENCE TO RELATED APPLICATION

This application is a Continuation of U.S. application Ser. No. 12/351,206, filed Jan. 9, 2009, the specification of which is incorporated herein by reference.

TECHNICAL FIELD

The present disclosure relates generally to semiconductor memory devices, methods, and systems, and more particularly, to modifying commands.

BACKGROUND

Memory devices are typically provided as internal, semiconductor, integrated circuits in computers or other electronic devices. There are many different types of memory, including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). A SSD can include non-volatile memory, e.g., NAND flash memory and NOR flash memory, and/or can include volatile memory, e.g., DRAM and SRAM, among various other types of non-volatile and volatile memory.

A SSD may be used to replace hard disk drives as the main storage device for a computer, as the SSD may have advantages over hard drives in terms of, for example, performance, size, weight, ruggedness, operating temperature range, and power consumption. For example, SSDs may have superior performance when compared to magnetic disk drives due to their lack of moving parts, which may ameliorate seek time, latency, and other electro-mechanical delays associated with magnetic disk drives. SSD manufacturers may use non-volatile flash memory to create flash SSDs that may not use an internal battery supply, thus allowing the drive to be more versatile and compact.

A SSD may include a number of memory devices, e.g., a number of memory chips (as used herein, "a number of" something can refer to one or more such things; e.g., a number of memory devices can refer to one or more memory devices). As one of ordinary skill in the art will appreciate, a memory chip may include a number of dies. Each die may include a number of memory arrays and peripheral circuitry thereon. A memory array may include a number of planes, with each plane including a number of physical blocks of memory cells. Each physical block may include a number of pages of memory cells that can store a number of sectors of data.

Commands, such as program commands, read commands, and erase commands, among other commands, may be used during operation of an SSD. For example, a program, e.g., write, command may be used to program data on a solid state drive, a read command may be used to read data on a solid state drive, and an erase command may be used to erase data on a solid state drive.

BRIEF DESCRIPTION OF THE DRAWINGS

FIGS. 4A and 4B illustrate a block diagram of a channel command queue in accordance with one or more embodiments of the present disclosure.

DETAILED DESCRIPTION

Figure 1:
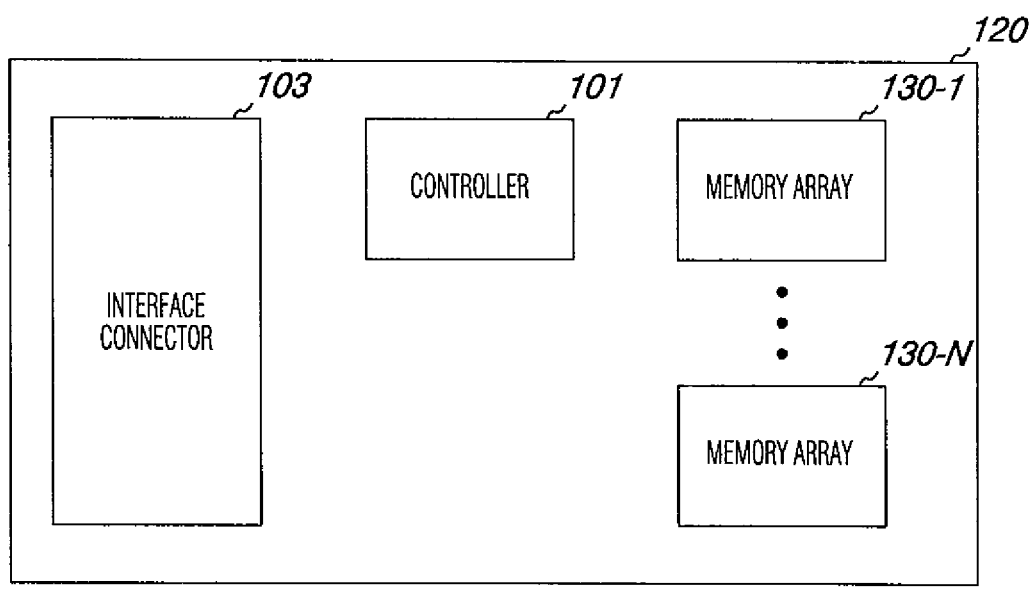
FIG. 1 illustrates a block diagram of a memory system in accordance with one or more embodiments of the present disclosure.

The present disclosure includes methods, devices, modules, and systems for modifying commands. One device embodiment includes a memory controller including a channel, wherein the channel includes a command queue configured to hold commands, and circuitry configured to modify at least a number of commands in the queue and execute the modified commands.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "N" and "M", particularly with respect to reference numerals in the drawings, indicate that a number of the particular feature so designated can be included with one or more embodiments of the present disclosure. The designators can represent the same or different number of the particular features.

The figures herein follow a numbering convention in which the first digit or digits correspond to the drawing figure number and the remaining digits identify an element or component in the drawing. Similar elements or components between different figures may be identified by the use of similar digits. For example, 101 may reference element "10" in FIG. 1, and a similar element may be referenced as 201 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 illustrates a block diagram of a memory system 120 in accordance with one or more embodiments of the present disclosure. In one or more embodiments, memory system 120 can be a solid state drive. The embodiment of FIG. 1 illustrates the components and architecture of one embodiment of memory system 120. In the embodiment illustrated in FIG. 1, memory system 120 includes a controller 101, an interface connector 103, and memory arrays 130-1, . . . , 130-N. In one or more embodiments, memory system 120 can include a housing to enclose memory system 120, though such housing is not essential.

The interface connector 103 can be used to communicate information between memory system 120 and another device such as a computing device. For example, when memory system 120 is used for data storage in a computing device, the interface 103 can be a serial advanced technology attachment (SATA), among others.

The controller 101 can communicate with memory arrays 130-1, . . . , 130-N to perform read, program (e.g., write), and erase operations, among other operations, on memory arrays 130-1, . . . , 130-N. The controller 101 can be used to manage the operations in memory system 120. Controller 101 can have circuitry that can be a number of integrated circuits. Controller 101 can also have circuitry that can be a number of discrete components. For one or more embodiments, the circuitry in controller 101 can include control circuitry for controlling access across a number of memory arrays. The circuitry in controller 101 can also include control circuitry for providing a translation layer between an external host and memory system 120. Thus, a memory controller could selectively couple an I/O connection (not shown in FIG. 1) of a memory array to receive the appropriate signal at the appropriate I/O connection at the appropriate time. Similarly, the communication protocol between a host and memory system 120 can be different than what is required for access of a memory array, e.g., memory array 130-1, . . . , 130-N. Memory controller 101 could then translate the commands received from a host into the appropriate commands to achieve the desired access to a memory array.

Memory arrays 130-1, . . . , 130-N can be various types of volatile and non-volatile memory arrays (e.g., flash and DRAM arrays, among others). In one or more embodiments, memory arrays 130-1, . . . , 130-N can be solid state memory arrays. Memory arrays 130-1, . . . , 130-N can include a number of memory cells that can be grouped in units. As used herein, a unit can include a number of memory cells, such as a page, physical block, plane, an entire array, or other groups of memory cells. For example, a memory array can include a number of planes, with each plane including a number of physical blocks. The memory cells in each physical block can be erased together as a unit, e.g., the cells in each physical block can be erased in a substantially simultaneous manner. For example, the cells in each physical block can be erased together in a single operation. A physical block can include a number of pages. The memory cells in each page can be programmed together as a unit, e.g., the cells in each page can be programmed in a substantially simultaneous manner. The memory cells in each page can also be read together as a unit. As an example, a 128 GB memory device can include 4314 bytes of data per page, 128 pages per physical block, 2048 physical blocks per plane, and 16 planes per device. However, embodiments are not limited to this example.

A physical sector of a memory system can correspond to a logical sector and can include overhead information, such as error correction code (ECC) information, and logical block address (LBA) information, as well as user data. As one of ordinary skill in the art will appreciate, logical block addressing is a scheme often used by a host for identifying a logical sector of information. As an example, each physical sector can store information representing a number of bytes of data, e.g., 256 bytes, 512 bytes, or 1,024 bytes, among other numbers of bytes. However, embodiments of the present disclosure are not limited to a particular number of bytes of data stored in a physical sector or associated with a logical sector.

Figure 2:
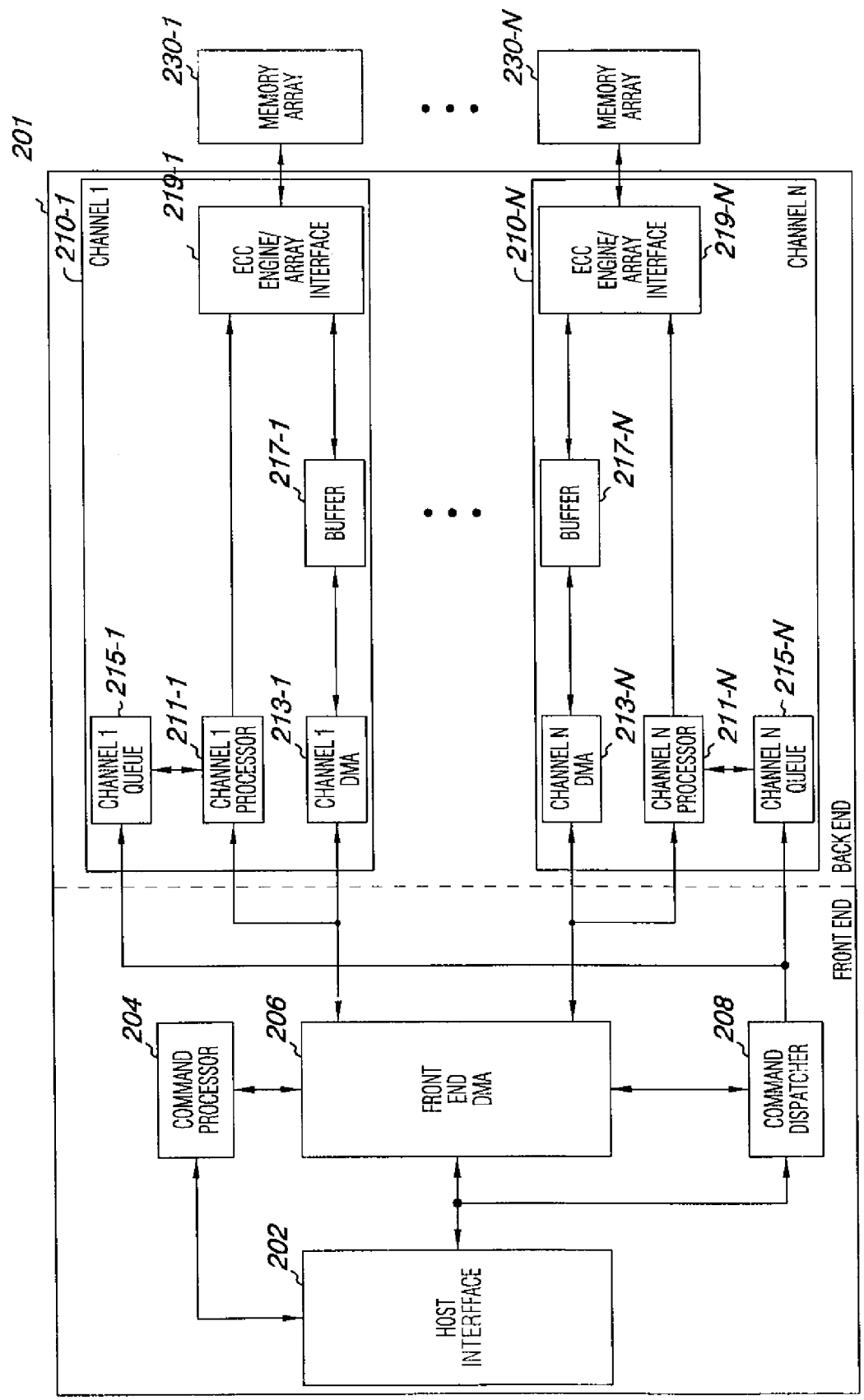
FIG. 2 illustrates a functional block diagram of a memory controller that can be operated in accordance with one or more embodiments of the present disclosure.

FIG. 2 illustrates a functional block diagram of a memory controller 201 that can be operated in accordance with one or more embodiments of the present disclosure. In one or more embodiments, memory controller 201 can be a solid state drive controller. In one or more embodiments, memory controller 201 can be analogous to controller 101 shown in FIG. 1.

As shown in FIG. 2, memory controller 201 includes a front end portion and a back end portion. The front end portion can correspond to a front end channel, and the back end portion can correspond to a number of back end channels, e.g., back end channel 1 210-1, . . . , back end channel N 210-N. Memory controller 201 can use the front end channel and back end channels to communicate with memory arrays 230-1, . . . , 230-N to perform read, program (e.g., write), and erase operations, among other operations on memory arrays 230-1, . . . , 230-N. In one or more embodiments, memory arrays 230-1, . . . , 230-N can be solid state memory arrays. In one or more embodiments, memory arrays 230-1, . . . , 230-N can be analogous to memory arrays 130-1, . . . , 130-N shown in FIG. 1.

As shown in FIG. 2, the front end portion, e.g., front end channel, of controller 201 includes host interface 202, command processor 204, front end direct memory access (DMA) 206, and command dispatcher 208. Back end channels 210-1, . . . , 210-N can include back end channel processors 211-1, . . . , 211-N, back end channel DMAs 213-1, . . . , 213-N, back end channel command queues 215-1, . . . , 215-N, data buffers 217-1, . . . , 217-N, and ECC engines/array interfaces 219-1, . . . , 219-N. Although the embodiment shown in FIG. 2 illustrates each back end channel 210-1, . . . , 210-N as including a back end channel processor, embodiments of the present disclosure are not so limited. For example, the back end portion can include circuitry, e.g., a single back end processor or hardware logic such as an application-specific integrated circuit (ASIC), which can operate on each back end channel 210-1, . . . , 210-N.

In the embodiment illustrated in FIG. 2, the front end channel can be coupled to the back end channels, e.g., back end channels 210-1, . . . , 210-N, via front end DMA 206 and command dispatcher 208. For example, front end DMA 206 can be coupled to back end channel processors 211-1, . . . , 211-N and back end channel DMAs 213-1, . . . , 213-N. Command dispatcher 208 can be coupled to back end channel command queues 215-1, . . . , 215-N. Host interface 202 can be used to communicate information between controller 201 and a host device (not shown), such as a computing device. In one or more embodiments, host interface 202 can be used to communicate information between controller 201 and the host device via an interface connector, e.g., interface connector 103 shown in FIG. 1.

In one or more embodiments, the information communicated between the host device and controller 201 can include a number of commands, such as program commands, read commands, and erase commands, among other commands. A program, e.g., write, command can be used to program data on memory arrays 230-1, . . . , 230-N, a read command can be used to read data on memory arrays 230-1, . . . , 230-N, and an erase command may be used to erase data on memory arrays 230-1, . . . , 230-N. The commands can include information indicating the type of operation (e.g., program, read, or erase) being commanded, an amount (e.g., a number of logical sectors), and a location (e.g., a starting address) where the execution of the command is to start, among other information. If the command is a program command, the command can be followed (not necessarily immediately) by data to be programmed to the corresponding memory cells. In one or more embodiments, the amount can be a number of logical sectors of a host corresponding to a number of memory cells. In one or more embodiments, the "location" included in the command can be a logical block address (LBA).

Data buffers 217-1, ..., 217-N can receive data to be programmed on memory arrays 230-1, ..., 230-N from the host via host interface 202, front end DMA 206, and back end channel DMAs 213-1, ..., 213-N. The data can be sent from data buffers 217-1, ..., 217-N to memory arrays 230-1, ..., 230-N via ECC engines/array interfaces 219-1, ..., 219-N.

In one or more embodiments, a LBA can be associated with a logical sector of the host, e.g., each logical sector of a host can be associated with a particular LBA. For example, LBA 1000 can be associated with a first logical sector, LBA 1001 can be associated with a second logical sector, LBA 1002 can be associated with a third logical, etc. As a further example, a command to program the memory cells in the array corresponding to 16 logical sectors starting at LBA 1000 can program the memory cells associated with LBAs 1000 through 1016, e.g., the memory cells corresponding to the logical sectors associated with LBAs 1000 through 1016.

Command dispatcher 208 can receive a number of commands from the host via host interface 202. Command dispatcher 208 can hold the received commands, and send the commands to appropriate back end channels 210-1, ..., 210-N. For example, back end channel queues 215-1, ..., 215-N can receive the commands from command dispatcher 208. In one or more embodiments, back end channels 210-1, ..., 210-N can receive the commands in the order in which command dispatcher 208 receives the commands from the host. In one or more embodiments, command dispatcher 208 can hold up to a particular number of commands, and command dispatcher 208 may be unable to receive commands from the host if command dispatcher 208 is holding the particular number of commands, e.g., if command dispatcher 208 is full.

In one or more embodiments, back end channel command queues 215-1, ..., 215-N can hold a number of commands received from command dispatcher 208. In one or more embodiments, the queues can hold the commands in the order in which they are to be executed. In one or more embodiments, the queues can hold the commands in the order in which they are received from the command dispatcher. In one or more embodiments, each queue can hold a number of commands equal to a number of commands that can be held by command dispatcher 208. For example, in one or more embodiments, command dispatcher 208 and the queues can each hold up to 32 commands. However, embodiments of the present disclosure are not limited to a particular number of commands.

According to one or more embodiments, back end channel processors 211-1, ..., 211-N can determine whether the commands held in the queues can be modified, and can modify the commands accordingly, such as while they are held in the queues. In one or more embodiments, the commands can be modified if the order in which the commands are held in a queue can be changed, if a number of the commands in a queue can be combined into a command (e.g., a single command), or if a number of the commands in a queue will be overwritten by a subsequent command in the queue. In one or more embodiments, modifying the commands can include changing the order in which the commands are held in the queue, combining a number of combinable commands in a queue into a single command, or deleting a number of commands in a queue which will be overwritten by a subsequent command in the queue, among other modifications.

In one or more embodiments, commands held in a queue are combinable, e.g., can be combined into a single command, if they are overlapping commands. As used herein, overlapping commands are a number of commands associated with overlapping addresses, such as overlapping logical block addresses (LBAs). For example, overlapping commands can include commands that are associated with a common location in the memory array on which the commands are to be executed. A specific example includes a first command to program the memory cells in an array corresponding to 48 logical sectors of a host, e.g., 48 logical sectors of data from the host, starting at logical block address (LBA) 1000 and a second command to program the memory cells in the array corresponding to 16 logical sectors of the host starting at LBA 1040. The first and second commands are overlapping commands, because both commands are associated with the same 8 logical sectors starting at LBA 1040. Accordingly, these two commands can be combined into a single command to program the memory cells corresponding to 56 logical sectors starting at LBA 1000. Overlapping commands held in the queue can be combined regardless of the order in which they are received in the queue.

In one or more embodiments, commands held in a queue are combinable, e.g., can be combined into a single command, if they are sequential commands. As used herein, sequential commands are a number of commands associated with sequential addresses, such as sequential LBAs, on which the commands are to be executed. For example, sequential commands can include commands that are associated with a logical sector which immediately precedes or immediately follows the logical sector(s) associated with one of the other commands. A specific example includes a first command to program the memory cells in an array corresponding to 16 logical sectors of a host starting at LBA 1000 and a second command to program the memory cells in the array corresponding to 32 logical sectors of the host starting at LBA 1016. The first and second commands are sequential commands, because the addresses associated with the first command immediately precedes the addresses associated with the second command, e.g., the location associated with the second command immediately follows the location associated with the first command. Accordingly, these two commands can be combined into a single command to program the memory cells corresponding to 48 logical sectors of the host starting at LBA 1000. Sequential commands held in the queue can be combined regardless of the order in which they are received in the queue.

In one or more embodiments, a first command in a queue will be overwritten by a subsequent command in the queue if the first command and the subsequent command are both associated with the same address, such as the same LBA, on which the commands are to be executed. For example, a first command to program the memory cells in an array corresponding to 16 logical sectors of a host starting at LBA 1000 will be overwritten by a subsequent command to program the memory cells in the array corresponding to 16 logical sectors of the host starting at LBA 1000, because the first command and the subsequent command are both associated with the same address. Accordingly, the first command can be deleted.

In one or more embodiments, a first command in a queue will be overwritten by a subsequent command in the queue if the address associated with the first command is within a range of addresses associated with the subsequent command. For example, a first command to program the memory cells in an array corresponding to 16 logical sectors of a host starting at LBA 1000 will be overwritten by a subsequent command to program the memory cells in the array corresponding to 48 logical sectors of the host starting at LBA 1000. Accordingly, the first command can be deleted.

Back end channel processors 211-1, ..., 211-N can execute the modified commands according to the order in which the modified commands are held in the queues. For example, if the commands are modified by changing the order in which the commands are held in the queues, the back end channel processors can execute the commands according to the changed order. If the commands are modified by combining a number of the commands into a single command, the back end channel processors can execute the single command instead of executing the number of commands separately. If the commands are modified by deleting a command(s) that would be overwritten by a subsequent command, the back end channel processors can execute the subsequent command and not the deleted command(s).

In one or more embodiments, if the commands held in back end channel command queues 215-1, . . . , 215-N are modified by combining a number of the commands into a single command, any commands held in command dispatcher 208 that are also combinable with the single command can be considered completed. Back end channel processors 211-1, . . . , 211-N can communicate that such commands are completed to command processor 204. For example, if a first command in queue 215-1 to program the memory cells in an array corresponding to 48 logical sectors of a host starting at LBA 1000 and a second command in queue 215-N to program the memory cells in the array corresponding to 16 logical sectors of the host starting at LBA 1040 are combined into a single command, e.g., a command to program the memory cells corresponding to 56 logical sectors of the host starting at LBA 1000, a command held in command dispatcher 208 to program the memory cells corresponding to 16 logical sectors of the host starting at LBA 1000 can be considered completed, e.g., back end channel processor 211-1 can communicate to command processor 204 that this command is completed, because this command is combinable with the single command.

Back end channel processors 211-1, . . . , 211-N can also modify data to be programmed on memory arrays 230-1, . . . , 230-N in accordance with the modified commands. For example, back end channel processors 211-1, . . . , 211-N can modify the data to match the modified commands. Back end channel processors 211-1, . . . , 211-N can modify the data before data buffers 217-1, . . . , 217-N receive the data, e.g., as the data is being sent from front end DMA 206 to data buffers 217-1, . . . , 217-N. Back end channel processors 211-1, . . . , 211-N can also modify the data after the data is sent from data buffers 217-1, . . . , 217-N to memory arrays 230-1, . . . , 230-N.

In one or more embodiments, back end channel command queues 215-1, . . . , 215-N can hold additional commands received from command dispatcher 208 while back end channel processors 211-1, . . . , 211-N are executing the modified commands. Back end channel processors 211-1, . . . , 211-N can modify the additional commands while executing the modified commands.

ECC engines/array interfaces 219-1, . . . , 219-N can be used to couple memory controller 201 to memory arrays 230-1, . . . , 230-N. Back end channel processors 211-1, . . . , 211-N can execute the modified commands on memory arrays 230-1, . . . , 230-N via ECC engines/array interfaces 219-1, . . . , 219-N. Although the embodiment shown in FIG. 2 illustrates the commands as traveling through back end channel processors 211-1, . . . , 211-N, embodiments of the present disclosure are not so limited. For example, the commands can travel directly from back end channel command queues 215-1, . . . , 215-N to memory arrays 230-1, . . . , 230-N via ECC engines/array interfaces 219-1, . . . , 219-N.

Data buffers 217-1, . . . , 217-N can hold data read during a number of previous read operations, e.g., read in response to a prior read command, performed on a number of memory cells located in memory arrays 230-1, . . . , 230-N. In one or more embodiments, the commands held in back end channel command queues 215-1, . . . , 215-N can include a number of commands to read a number of memory cells which have been previously read, e.g., whose data is already held in data buffers 217-1, . . . , 217-N. In such embodiments, back end channel processors 211-1, . . . , 211-N can execute these read commands by accessing data buffers 217-1, . . . , 217-N, e.g., without accessing memory arrays 230-1, . . . , 230-N or by only accessing the memory array(s) only for data that is not in the data buffer(s).

In one or more embodiments, modifying commands by combining a number of combinable commands into a single command can eliminate or reduce the number of partial page programming operations performed by a memory system, which can improve the overall performance and/or reliability of the system. As will be understood by one of skill in the art, a partial page programming operation can include locating a new block, reading data stored on a page located in an old block into a data buffer, merging and/or replacing the data in the data buffer with new data such that the data in the data buffer includes both new data and data read from the page in the old block, and programming a page in the new block with the data in the data buffer. The partial page programming operation can also include transferring the data stored on the remaining pages in the old block to the remaining pages in the new block (e.g., reading the data stored on the remaining pages in the old block and programming the remaining pages in the new block with this data), marking the old block for erasure, and erasing the old block.

As will be understood by one of skill in the art, a partial page programming operation can result from, e.g., be initiated by, a command to program only a portion of a page. For example, a command to program only a portion of a page can initiate a partial page programming operation if a command to program a remaining portion of the page has already been executed. However, a partial page programming operation can be avoided, e.g., the need to perform the operations associated with a partial page programming operation described above can be avoided, by combining a command to program only a portion of a page with a number of commands to program the remaining portion(s) of the page in accordance with one or more embodiments of the present disclosure. For example, a partial page programming operation involving a page that includes memory cells corresponding to 4 logical sectors of a host starting at LBA 3000 can be avoided by combining a command to program the memory cells in the page corresponding to 2 logical sectors of the host starting at LBA 3000 with a command to program the memory cells in the page corresponding to 2 logical sectors of the host starting at LBA 3002 in accordance with one or more embodiments of the present disclosure.

In one or more embodiments, command processor 204 can perform functions analogous to the functions performed by back end channel processors 211-1, . . . , 211-N. For example, command processor 204 can determine whether the commands held in command dispatcher 208 can be modified, and can modify the commands accordingly while they are held in command dispatcher 208. The commands can be modified if the order in which the commands are sent to the back end channel can be changed, if a number of the commands can be combined into a single command, if a number of the commands will be overwritten by a subsequent command, etc. Modifying the commands can include changing the order in which command dispatcher 208 sends the commands to the back end channel, combining a number of combinable commands received by command dispatcher 208 into a single command, deleting a number of commands received by command dispatcher 208 which will be overwritten by a subsequent command received by command dispatcher 208, etc.

In one or more embodiments, command processor 204 can perform these functions, e.g., can determine whether the commands held in command dispatcher 208 can be modified and can modify the commands accordingly while they are held in command dispatcher 208, when command dispatcher 208 is unable to receive commands from the host. For example, command processor 204 can perform these functions when command dispatcher 208 is full.

In one or more embodiments, command processor 204 can determine whether commands held in command dispatcher 208 are commands that are not to be modified by back end channel processors 211-1, . . . , 211-N. If command processor 204 determines that a number of commands held in command dispatcher 208 are not to be modified by the back end channel processors, command processor 204 can mark, e.g., tag, these commands as commands that are not to be modified by the back end channel processors. Commands marked by command processor 204 as not to be modified will not be modified by back end channel processors 211-1, . . . , 211-N while they are held in back end channel command queues 215-1, . . . , 215-N. For example, if back end channel command queue 215-1 holds a first command to program the memory cells in an array corresponding to 48 logical sectors of a host starting at LBA 1000 and a second command to program the memory cells in the array corresponding to 16 logical sectors of the host starting at LBA 1040, and command processor 204 has marked one or both of these commands as a command(s) not to be modified, back end channel processor 211-1 will not modify, e.g., combine, these two commands. Commands that are not to be modified can include, for example, commands which are a part of an overwrite operation, e.g., an operation in which a first program command is followed by a read command, and the read command is followed by a second program command intended to overwrite the initial program command. However embodiments of the present disclosure are not so limited, and commands that are not to be modified can include other types of commands.

Operating a memory device in accordance with one or more embodiments of the present disclosure can reduce the amount of time used to execute a number of commands by, for example, deleting repetitive commands and combining multiple commands into one command, thereby increasing the efficiency of the memory device. Additionally, because the back end channel can be tightly coupled with, e.g., located near, memory arrays 230-1, . . . , 230-N, the efficiency of a memory device can be increased by operating it in accordance with one or more embodiments of the present disclosure.

Figure 3:
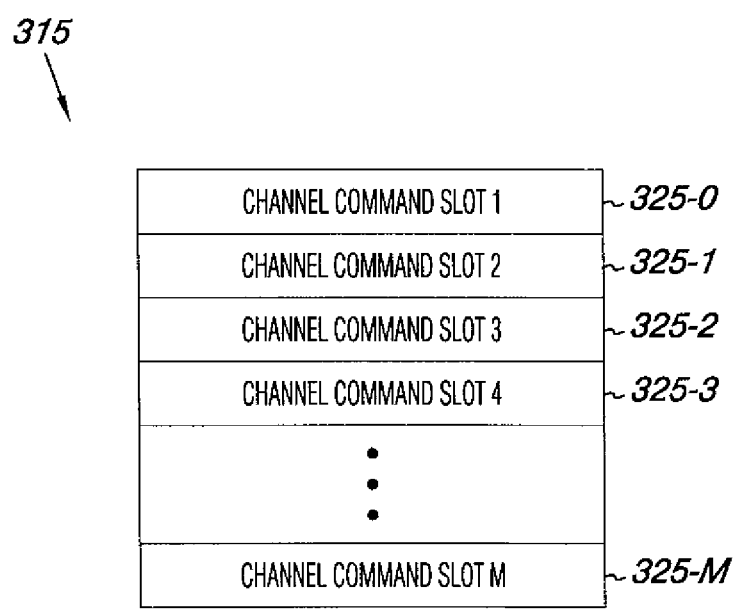
FIG. 3 illustrates a block diagram of a channel command queue in accordance with one or more embodiments of the present disclosure.

FIG. 3 illustrates a block diagram of channel command queue 315 in accordance with one or more embodiments of the present disclosure. In one or more embodiments, channel command queue 315 can be analogous to back end channel command queues 215-1, . . . , 215-N shown in FIG. 2.

As shown in FIG. 3, channel command queue 315 includes channel command slot 1 325-1, channel command slot 2 325-2, channel command slot 3 325-3, channel command slot 4 325-4, . . . channel command slot M 325-M. Each channel command slot 325-1, 325-2, 325-3, 325-4, . . . , 325-M can hold one command, e.g., channel command queue 315 can hold up to M commands. In one or more embodiments, the commands held in channel command queue 315 can be modified, as previously described herein.

In one or more embodiments, the number of slots in channel command queue 315, e.g., the number of commands that can be held by channel command queue 315, can be equal to a number of commands that can be held by a device from which channel command queue 315 receives commands, such as command dispatcher 208 shown in FIG. 2. For example, if command dispatcher 208 can hold up to 32 commands, channel command queue 315 can have 32 slots, e.g., channel command queue 315 can hold up to 32 commands. However, embodiments of the present disclosure are not so limited, and channel command queue 315 can have a different number of slots.

In one or more embodiments, channel command queue 315 can hold commands in the order in which they are to be executed. In one or more embodiments, channel command queue 315 can hold commands in the order in which channel command queue 315 receives the commands. For example, channel command slot 1 325-1 can hold a command that is to be executed first and/or was received first by channel command queue 315, channel command slot 1 325-2 can hold a command that is to be executed after the command held in channel command slot 1 325-1 is executed and/or was received after the command held in channel command slot 1 325-1 was received, channel command slot 2 325-3 can hold a command that is to be executed after the command held in channel command slot 2 325-2 is executed and/or was received after the command held in channel command slot 2 325-2 was received, etc.

FIG. 4A illustrates a block diagram of a channel command queue 415 in accordance with one or more embodiments of the present disclosure. In one or more embodiments, channel command queue 415 can be analogous to back end channel 1 command queues 215-1, . . . , 215-N shown in FIG. 2 or channel command queue 315 shown in FIG. 3. Channel command queue 415 includes channel command slots 425-1, 425-2, 425-3, 425-4, 425-5, 425-6, 425-7, 425-8, . . . , 425-M, which can be analogous to channel command slot 1 325-1, channel command slot 2 325-2, channel command slot 3 325-3, channel command slot 4 325-4, . . . channel command slot M 325-M shown in FIG. 3.

In the embodiment illustrated in FIG. 4A, each channel command slot 425-1 through 425-M is holding a command. For example, channel command slot 425-1 is holding command 1, channel command slot 425-2 is holding command 2, etc. Command 1 is a command to program the memory cells in an array corresponding to 16 logical sectors of a host, e.g., 16 logical sectors of data from the host, starting at LBA 1000. Command 2 is a command to read the memory cells in the array corresponding to 4 logical sectors of the host starting at LBA 2000. Command 3 is a command to program the memory cells in the array corresponding to 48 logical sectors of the host starting at LBA 1000. Command 4 is a command to read the memory cells in the array corresponding to 10 logical sectors of the host starting at LBA 2002. Command 5 is a command to read the memory cells in the array corresponding to 16 logical sectors of the host starting at LBA 2000. Command 6 is a command to program the memory cells in the array corresponding to 16 logical sectors of the host starting at LBA 1040. Command 7 is a command to program the memory cells in the array corresponding to 2 logical sectors of the host starting at LBA 3000. Command 8 is a command to program the memory cells in the array corresponding to 2 logical sectors of the host starting at LBA 3002.

The commands held in channel command queue 415 can be modified in accordance with one or more embodiments of the present disclosure. For example, the commands in channel command slots 425-1, 425-3, and 425-6 can be combined into a command (e.g., a single command) to program the memory cells in the array corresponding to 56 logical sectors of the host starting at LBA 1000. The commands in channel command slots 425-2 and 425-4 can be deleted. The commands in channel command slots 425-7 and 425-8 can be combined into a single command to program the memory cells in the array corresponding to 4 logical sectors of the host starting at LBA 3000.

FIG. 4B illustrates a block diagram of channel command queue 415 after the commands shown in FIG. 4A have been modified in accordance with one or more embodiments of the present disclosure. As shown in FIG. 4B, command 1 held in channel command slot 425-1 is a command to program the memory cells in the array corresponding to 56 logical sectors of the host starting at LBA 1000, command 2 held in channel command slot 425-2 is a command to read the memory cells in the array corresponding to 16 logical sectors of the host starting at LBA 2000, and command 3 held in channel command slot 425-3 is a command to program the memory cells in the array corresponding to 4 logical sectors of the host starting at LBA 3000.

CONCLUSION

The present disclosure includes methods, devices, modules, and systems for modifying commands. One device embodiment includes a memory controller including a channel, wherein the channel includes a command queue configured to hold commands, and circuitry configured to modify at least a number of commands in the queue and execute the modified commands.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory controller, comprising:
a first channel configured to:
  hold commands; and
  modify at least a number of commands in the first channel; and
a second channel configured to:
  hold commands; and
  modify at least a number of commands in the second channel;
wherein:
  the first channel is a front end channel and the second channel is a back end channel;
  the first channel includes a front end direct memory access (DMA);
  the second channel includes a back end DMA coupled to the front end DMA; and
  the back end DMA is configured to couple the first channel to the second channel.

2. The memory controller of claim 1, wherein:
the first channel is configured to combine a number of combinable commands in the first channel into a command; and
the second channel is configured to combine a number of combinable commands in the second channel into a command.

3. The memory controller of claim 1, wherein:
the first channel is configured to delete a command in the first channel which will be overwritten by an other command in the first channel; and
the second channel is configured to delete a command in the second channel which will be overwritten by an other command in the second channel.

4. A memory controller, comprising:
a first channel, wherein the first channel includes circuitry configured to:
  hold a number of commands; and
  perform a number of functions selected from the group of functions including:
    changing an order of commands in the first channel;
    combining a number of combinable commands in the first channel into a command; and
    deleting a command in the first channel which will be overwritten by an other command in the first channel; and
a second channel, wherein the second channel includes circuitry configured to:
  hold a number of commands; and
  perform a number of functions selected from the group of functions including:
    changing an order of commands in the second channel;
    combining a number of combinable commands in the second channel into a command; and
    deleting a command in the second channel which will be overwritten by an other command in the second channel;
wherein:
  the first channel is a front end channel and the second channel is a back end channel;
  the first channel includes a front end direct memory access (DMA);
  the second channel includes a back end DMA coupled to the front end DMA; and
  the back end DMA is configured to couple the first channel to the second channel.

5. The memory controller of claim 4, wherein:
the first channel includes circuitry configured to send commands to the second channel; and
changing the order of commands in the first channel includes changing an order in which the circuitry in the first channel sends the commands to the second channel.

6. The memory controller of claim 5, wherein changing the order of commands in the second channel includes changing an order in which the commands are held in the second channel.

7. The memory controller of claim 4, wherein combinable commands include:
 overlapping commands; and
 sequential commands.

8. The memory controller of claim 7, wherein overlapping commands include commands associated with overlapping logical block addresses.

9. The memory controller of claim 7, wherein sequential commands include commands associated with sequential logical block addresses.

10. The memory controller of claim 4, wherein at least one of the first and second channels is configured to:
 hold a number of read commands that include a command to read data stored on a number of memory cells in a memory array previously read in response to a prior read command; and
 execute the command to read the data previously read in response to the prior read command without accessing the memory array.

11. The memory controller of claim 10, wherein:
 the at least one of the first and second channels includes a data buffer configured to hold the data previously read in response to the prior read command; and
 the at least one of the first and second channels is configured to execute the command to read the data previous read in response to the prior read command by accessing the data buffer.

12. A memory controller, comprising:
 a front end channel, wherein the front end channel includes circuitry configured to:
  hold a number of commands; and
  modify commands in the front end channel; and
 a back end channel, wherein the back end channel includes circuitry configured to:
  hold a number of commands; and
  modify commands in the back end channel;
 wherein:
  the front end channel includes a front end direct memory access (DMA);
  the back end channel includes a back end DMA coupled to the front end DMA; and
  the back end DMA is configured to couple the front end channel to the back end channel.

13. The memory controller of claim 12, wherein the front end channel is configured to receive commands from a host.

14. The memory controller of claim 12, wherein the front end channel includes:
 a command dispatcher configured to hold a number of commands; and
 a command processor configured to modify commands in the front end channel.

15. The memory controller of claim 12, wherein the back end channel includes:
 a command queue configured to hold a number of commands; and
 a processor configured to modify commands in the back end channel.

16. The memory controller of claim 12, wherein the back end DMA is configured to receive data to be programmed to a memory array from the front end DMA.

17. A method for operating a memory device, comprising:
 modifying a number of commands held in a first channel, wherein:
  the first channel is a front end channel; and
  the first channel includes a front end direct memory access (DMA);
 modifying a number of commands held in a second channel, wherein:
  the second channel is a back end channel; and
  the second channel includes a back end DMA coupled to the front end DMA; and
 coupling the first channel to the second channel using the back end DMA.

18. The method of claim 17, wherein:
 the first channel is included in a front end portion of the memory device; and
 the second channel is included in a back end portion of the memory device.

19. The method of claim 17, wherein the method includes:
 modifying the number of commands held in the first channel while the number of commands are held in the first channel; and
 modifying the number of commands held in the second channel while the number of commands are held in the second channel.

20. The method of claim 17, wherein the method includes:
 determining whether commands held in the first channel are modifiable;
 modifying the commands held in the first channel determined to be modifiable;
 determining whether commands held in the second channel are modifiable; and
 modifying the commands held in the second channel determined to be modifiable.

21. The method of claim 17, wherein modifying a number of commands includes performing a number of functions selected from the group of functions including:
 changing an order of commands;
 combining a number of combinable commands into a command; and
 deleting a command which will be overwritten by an other command.

22. The method of claim 21, wherein a command will be overwritten by an other command if the command and the other command are associated with a same logical block address (LBA) or if the command is associated with an LBA that is within a range of LBAs associated with the other command.

23. The method of claim 17, wherein the method includes sending the modified number of commands held in the first channel to the second channel.

24. The method of claim 17, wherein the method includes executing the modified number of commands held in the first and second channels.

25. The method of claim 17, wherein the number of commands held in the first channel is equal to the number of commands held in the second channel.

* * * * *